(12) United States Patent
Hong

(10) Patent No.: US 12,672,106 B2
(45) Date of Patent: Jun. 30, 2026

(54) PAGING RECOVERY PROCESSING METHOD AND APPARATUS, COMMUNICATIONS DEVICE, AND STORAGE MEDIUM

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 291 days.

(21) Appl. No.: 18/573,432

(22) PCT Filed: Jun. 25, 2021

(86) PCT No.: PCT/CN2021/102509
§ 371 (c)(1),
(2) Date: Dec. 21, 2023

(87) PCT Pub. No.: WO2022/267042
PCT Pub. Date: Dec. 29, 2022

(65) Prior Publication Data
US 2024/0298295 A1      Sep. 5, 2024

(51) Int. Cl.
| | |
|---|---|
| *H04W 52/02* | (2009.01) |
| *H04W 68/00* | (2009.01) |
| *H04W 68/02* | (2009.01) |
| *H04W 68/12* | (2009.01) |

(52) U.S. Cl.
CPC .................................. *H04W 68/02* (2013.01)

(58) Field of Classification Search
CPC .............................. H04W 68/02; H04W 68/00
USPC ......................................................... 455/458
See application file for complete search history.

(56) References Cited

U.S. PATENT DOCUMENTS

| | | |
|---|---|---|
| 2018/0160422 A1 | 6/2018 | Pathak et al. |
| 2022/0286950 A1* | 9/2022 | Kumar .................. H04W 8/183 |

FOREIGN PATENT DOCUMENTS

| | | |
|---|---|---|
| CN | 103167452 A | 6/2013 |
| CN | 112189352 A | 1/2021 |
| CN | 112514472 A | 3/2021 |
| CN | 112788745 A | 5/2021 |
| CN | 113543313 A | 10/2021 |
| WO | 2020209620 A1 | 10/2020 |

OTHER PUBLICATIONS

IP.com search history (Year: 2025).*
International Search Report of PCT/CN2021/102509 dated Mar. 8, 2022 with English translation, (4p).
CNOA issued in Application No. 202180001965.0 dated Jan. 22, 2025 with English translation, (20p).

* cited by examiner

*Primary Examiner* — Moustapha Diaby
(74) *Attorney, Agent, or Firm* — Arch & Lake LLP; Hao Tan; Shen Wang

(57) ABSTRACT

Embodiments of the present disclosure provide a paging recovery processing method and apparatus, a communications device, and a storage medium. The paging recovery processing method is performed by a network device, and includes: receiving first information of a first SIM; and in response to the first information indicating the first SIM rejects the paging, determining time for re-paging the first SIM.

17 Claims, 8 Drawing Sheets

1

PAGING RECOVERY PROCESSING METHOD AND APPARATUS, COMMUNICATIONS DEVICE, AND STORAGE MEDIUM

CROSS-REFERENCE TO RELATED APPLICATIONS

The present application is a U.S. National Stage of International Application No. PCT/CN2021/102509, filed on Jun. 25, 2021, the content of which is incorporated by reference herein in its entireties for all purposes.

TECHNICAL FIELD

The present disclosure relates to but is not limited to the field of communication technology, and in particular to a processing method, device, communication device, and storage medium for restoring paging.

BACKGROUND

With the development of wireless communication technology, there is more and more User Equipment (UE) for multi-subscriber identity modules (SIM) in the market. At present, the processing method for multi-SIM UE are mainly based on the implementation of various UE manufacturers, which has led to many different UE behaviors and processing methods (such as dual-card single-standby, dual-card dual-standby single-communication, dual-card dual-standby dual-communication, etc.). It may lead to some problems. For example, when multi-SIM UE is communicating with a first system, it needs to occasionally detect a second system, such as monitoring paging, performing measurements, reading system messages, etc. This may have an impact on the performance of the first system. If these operations are not carried out in the second system, such as not monitoring paging, it may cause the service of the second system to be unable to be established. Moreover, when multi-SIM UE receives a paging message on the second system, it also needs to decide whether to respond to the paging message, based on user configured rules. If the multi-SIM UE does not respond to the paging message of the second system, the second system will continue to page the terminal until the maximum number of times is reached. On the one hand, this will waste signaling resources, and on the other hand, it will also trigger error statistics or operations in the second system.

SUMMARY

The embodiments of the present disclosure provide a processing method, a device, a communication device and a storage medium for restoring paging.

According to a first aspect of the present disclosure, there is provided a processing method for restoring paging, performed by a network device, including: receiving first information for a first SIM; determining time for re-paging the first SIM in response to the first information indicating that the first SIM rejects paging.

According to a second aspect of the present disclosure, there is provided a processing method for restoring paging, performed by user equipment UE with multiple SIMs, the method includes sending, in response to determining to reject to respond to a paging message for a first SIM in an idle state among the multiple SIMs, first information to a first network that sends the paging message, where the first information indicates that the first SIM rejects paging, and the first information is at least used for the first network to determine time for re-paging the first SIM.

According to a third aspect of the present disclosure, there is provided a processing device for restoring paging, applied to a network device, including a first receiving module configured to receive first information for a first subscriber identity module; a first determining module configured to determine time for re-paging the first SIM in response to the first information indicating that the first SIM rejects paging.

According to fourth aspect of the present disclosure, there is provided a processing device for restoring paging, applied to user equipment UE with multiple subscriber identity modules SIMs, the device includes a second sending module configured to send first information to a first network that sends a paging message for a first SIM in an idle state among the multiple SIMs in response to determining to reject to respond to the paging message, where the first information indicates that the first SIM rejects paging, and the first information is at least used for the first network to determine time for re-paging the first SIM.

According to fifth aspect of the present disclosure, there is provided a communication device, including a processor; a memory for storing processor executable instructions; where the processor is configured to implement a processing method for restoring paging according to any embodiment of the present disclosure when running the executable instructions.

According to sixth aspect of the present disclosure, there is provided a computer storage medium, where the computer storage medium stores a computer executable program, and when the executable program is executed by a processor, the processing method for restoring paging according to any embodiment of the present disclosure is implemented.

It should be understood that the general description above and the detailed description in the following text are only illustrative and explanatory, and cannot limit the embodiments of the present disclosure.

3

Figure 14:
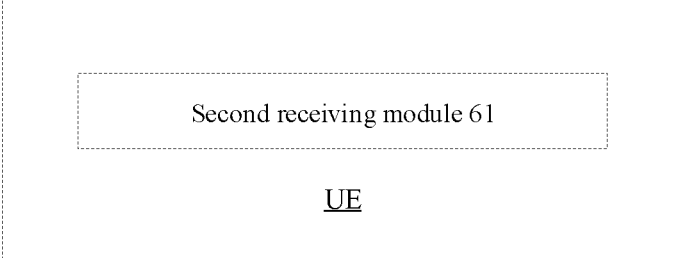

FIG. 14 is a block diagram of a processing device for restoring paging according to an exemplary embodiment.

Figure 15:
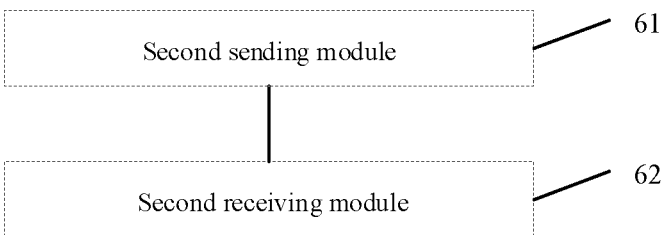

FIG. 15 is a block diagram of a processing device for restoring paging according to an exemplary embodiment.

Figure 16:
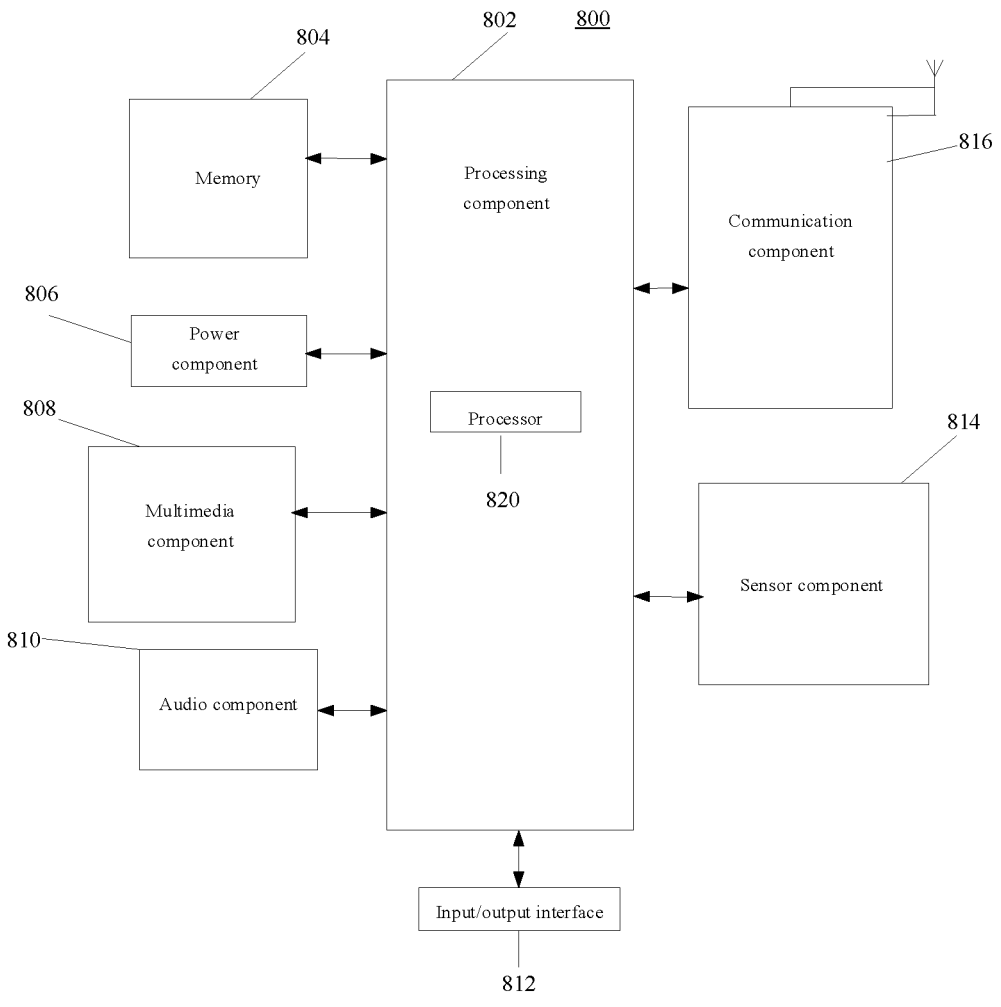

FIG. 16 is a block diagram of a UE according to an exemplary embodiment.

Figure 17:
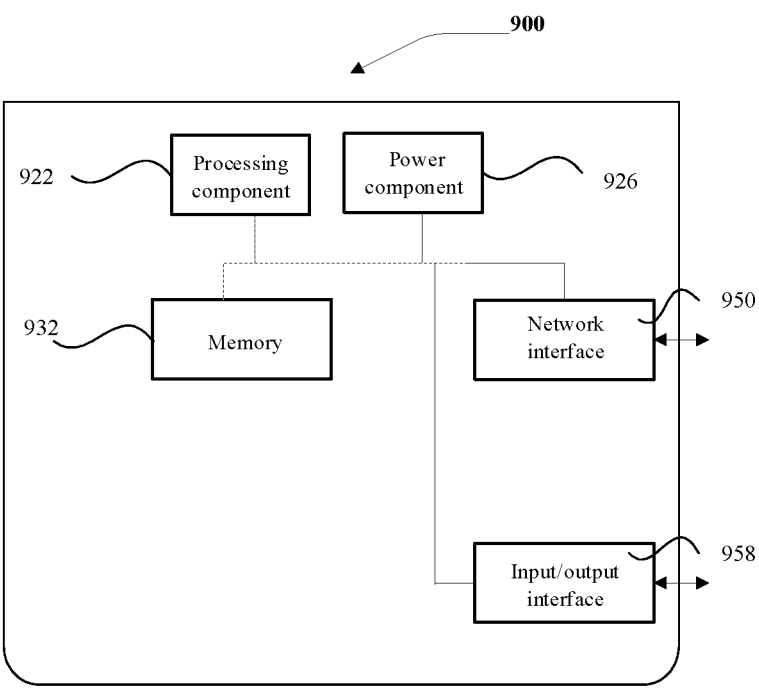

FIG. 17 is a block diagram of a base station according to an exemplary embodiment.

DETAILED DESCRIPTION

Here, we will provide a detailed explanation of exemplary embodiments, which are illustrated in the accompanying drawings. When the following description involves drawings, unless otherwise indicated, the same reference numbers in different drawings represent the same or similar elements. The embodiments described in the following exemplary embodiments do not represent all embodiments consistent with the embodiments of the present disclosure. On the contrary, they are only examples of devices and methods consistent with some aspects of the embodiments of the present disclosure.

The terms used in the embodiments of the present disclosure are solely for the purpose of describing specific embodiments and are not intended to limit the embodiments of the present disclosure. The singular forms used in the embodiments of the present disclosure and the attached claims are also intended to include the majority form, unless the context clearly indicates otherwise. It should also be understood that the term "and/or" used herein refers to and includes any or all possible combinations of one or more related listed items.

It should be understood that although various information may be described using terms such as first, second, third, etc. in the embodiments of the present disclosure, such information should not be limited to these terms. These terms are only used to distinguish information of the same type from each other. For example, without departing from the scope of the embodiments of the present disclosure, the first information may also be referred to as the second information, and similarly, the second information may also be referred to as the first information. Depending on the context, the word "if" used here can be interpreted as "when" or "in response to determining".

Figure 1:
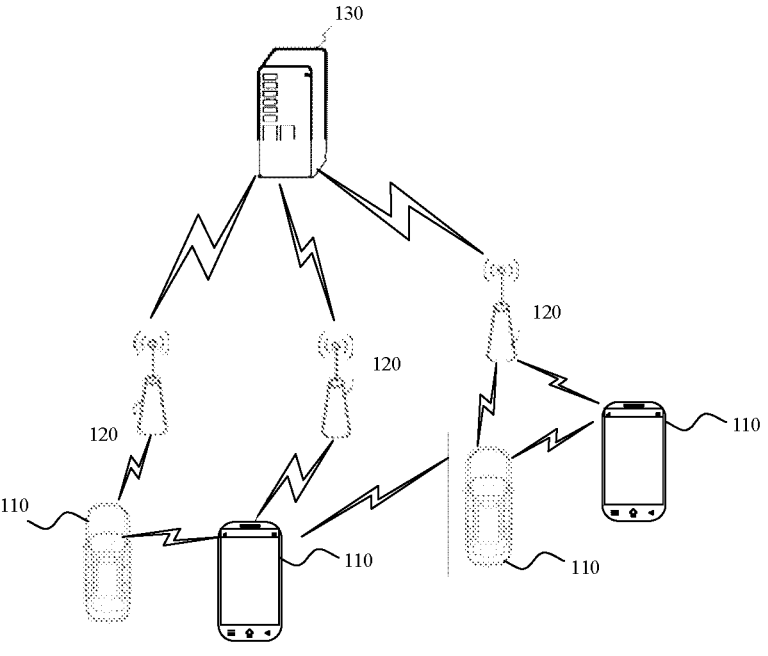
FIG. 1 is a schematic diagram of the structure of a wireless communication system.

Please refer to FIG. 1, which illustrates a schematic diagram of the structure of a wireless communication system provided in the embodiments of the present disclosure. As shown in FIG. 1, the wireless communication system is a communication system based on cellular mobile communication technology, which can include several user equipment 110 and several base stations 120.

User equipment 110 can be a device that provides voice and/or data connectivity to the user. User equipment 110 can communicate with one or more core networks through a Radio Access Network (RAN). User equipment 110 can be an IoT user equipment, such as a sensor device, a mobile phone (or known as a "cellular" phone), and a computer with an IoT user equipment, such as fixed, portable, pocket, handheld, computer built-in, or onboard devices. For example, station (STA), subscriber unit, subscriber station, mobile station, mobile, remote station, access points, remote terminal, access terminal, user terminal, user agent, user device or user equipment. Alternatively, user equipment 110 can also be a device of an unmanned aerial vehicle. Alternatively, user equipment 110 can also be an onboard device, such as a wireless communication enabled onboard computer or a wireless user equipment connected to an external onboard computer. Alternatively, user equipment 110 can also be a roadside device, such as a street light, signal light, or other roadside device with wireless communication capabilities.

Base station 120 can be a network side device in a wireless communication system. The wireless communication system can be the fourth generation mobile communication (4G) system, also known as Long Term Evolution (LTE) system. Alternatively, the wireless communication system can also be a 5G system, also known as a new radio system or a 5G NR system. Alternatively, the wireless communication system can also be the next generation system of the 5G system. The access network in the 5G system can be referred to as the New Generation Radio Access Network (NG-RAN).

Base station 120 can be an evolutionary base station (eNB) used in a 4G system. Alternatively, base station 120 can also be a centralized distributed architecture base station (gNB) in a 5G system. When base station 120 adopts a centralized distributed architecture, it usually includes a central unit (CU) and at least two distributed units (DU). The central unit is equipped with a protocol stack of Packet Data Convergence Protocol (PDCP) layer, Radio Link Control (RLC) layer, and Medium Access Control (MAC) layer. The distributed units are equipped with a protocol stack of physical (PHY) layer. The specific implementation method of base station 120 is not limited in the embodiments of the present disclosure.

A wireless connection can be established between base station 120 and user equipment 110 through radio. In different embodiments, the radio is a radio based on the fourth generation mobile communication network technology (4G) standard. Alternatively, the radio is a radio based on the fifth generation mobile communication network technology (5G) standard, such as a new radio. Alternatively, the radio can also be a radio based on the next-generation mobile communication network technology standard of 5G.

In some embodiments, E2E (End to End) connections can also be established between user equipments 110. For example, in vehicle to everything (V2X) communication, there are scenarios such as vehicle to vehicle (V2V) communication, vehicle to infrastructure (V2I) communication, and vehicle to pedestrian (V2P) communication.

Here, the aforementioned user equipment can be considered as a terminal device in the following embodiments.

In some embodiments, the aforementioned wireless communication system may also include a network management device 130.

Several base stations 120 are connected to the network management device 130. The network management device 130 can be a core network device in the wireless communication system. For example, the network management device 130 can be a Mobility Management Entity (MME) in the Evolved Packet Core (EPC). Alternatively, the network management device can also be other core network device, such as a Service GateWay (SGW), Public Data Network GateWay (PGW), Policy and Charging Rules Function (PCRF), or Home Subscription Server (HSS). The implementation form of the network management device 130 is not limited by the embodiments of the present disclosure.

Figure 2:
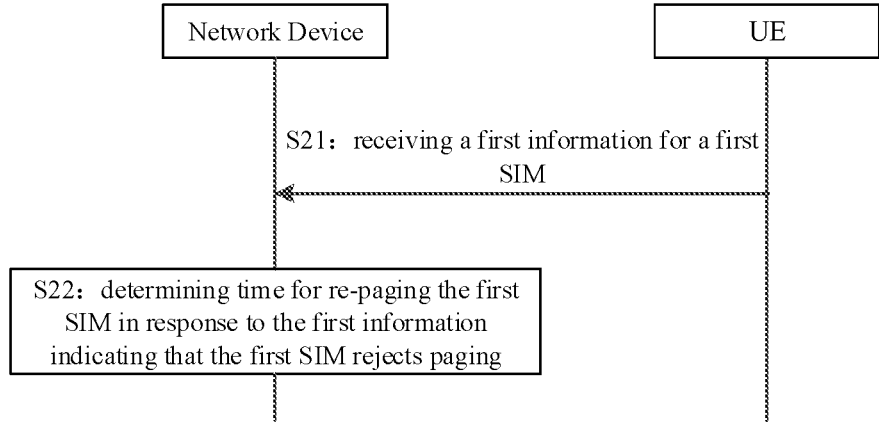
FIG. 2 is a schematic diagram of a processing method for restoring paging based on an exemplary embodiment.

As shown in FIG. 2, the embodiment of the present disclosure provides a processing method for restoring paging, which is executed by a network device, including Step S21, receiving first information for a first SIM; Step S22, determining time for re-paging the first SIM in response to the first information indicating that the first SIM rejects paging.

In one embodiment, the network device may be an access network device or a core network device.

For ease of description, in the embodiment of the present disclosure, the transmission from the core network to the UE through the access network device or other device can be referred to as the transmission from the core network to the UE. Correspondingly, the transmission from the UE to the core network through the access network device or other device is referred to as the transmission from the UE to the core network.

In one embodiment, the access network device may be, but is not limited to, a base station. The base station can be an interface device for UE to access the Internet, and can be of various types of base stations. For example, a base station can be a 3G base station, a 4G base station, a 5G base station, or other evolving base station.

In one embodiment, the core network device may be, but is not limited to, various physical or logical entities of the core network. For example, the core network device may be mobility management entity or service gateway, etc.

Taking the base station as an example, when UE sends information to the core network, it can refer to UE first sending the information to the base station, and then the base station sending it to the core network. For example, the information sent is non-access layer information, and the base station can send the information to the core network. The core network sends information to the UE, which can refer to the core network first sending the information to the base station, and then the base station sends it to the UE. For example, the information sent is non-access layer information, and the base station can send the information to the UE. Correspondingly, this also applies to the situation where the core network receives UE sent information or UE receives core network sent information.

The embodiment of the present disclosure provides a processing method for restoring paging, which is executed by a network device, including receiving first information for a first SIM sent by the first SIM of a UE; determining time to page the first SIM again in response to the first information indicating that the first SIM rejects paging.

In one embodiment, UE can be various mobile terminals or fixed terminals. For example, UE can be, but is not limited to, mobile phones, computers, servers, wearable devices, game control platforms, or multimedia devices.

In one embodiment, the UE includes multiple SIMs; multiple SIMs at least include a first SIM in an idle or inactive state. Multiple SIMs also include a second SIM in a connected state. In this way, in the embodiment of the present disclosure, the network device can receive first information sent by the first SIM in an idle state.

In one embodiment, the first information is any signaling of a service request containing a paging rejection indication, and the paging rejection indication indicates that the first SIM rejects paging.

The embodiment of the present disclosure provides a processing method for restoring paging, which is executed by a network device, including receiving a service request signaling containing a paging rejection indication from a first SIM, where the paging rejection indication indicates the first SIM rejects paging; determining time to page the first SIM again in response to first information indicating that the first SIM rejects paging. In this way, in the embodiment of the present disclosure, the network device can directly determine that the first SIM rejects paging based on the rejection paging indication carried in the service request signaling.

In the embodiment of the present disclosure, the network device can determine the time for re-paging the first SIM when it is determined that the first SIM rejects paging. Thus, the network device do not need to page the first SIM at any time after receiving the first information and before re-paging the first SIM, and can only page the first SIM at the determined time for re-paging the first SIM. In this way, it can greatly reduce the number of times of sending incorrect paging by the network device, reduce the error statistics of paging times, and reduce the waste of signaling and other resources.

The embodiment of the present disclosure provides a processing method for restoring paging, executed by a network device, including receiving first information for a first SIM; determining time to page the first SIM again based on the first information.

In one embodiment, the first information includes a service request signaling containing a paging rejection indication and auxiliary information. For example, the network device receives a service request signaling sent by the first SIM of the UE, and the service request signaling includes a paging rejection indication and auxiliary information. The network device responds to the paging rejection indication and determines the time for re-paging the first SIM based on the auxiliary information. In this way, the embodiment of the present disclosure can determine the time for re-paging the first SIM based on the auxiliary information after receiving the paging rejection indication, i.e. determining that the UE rejects to page the first SIM.

In one embodiment, the first information includes a service request signaling not containing a paging rejection indication. For example, the network device receives a service request signaling sent by the first SIM of the UE, and the service request signaling does not include a paging rejection indication. The network device determines the time for re-paging the first SIM in response to receiving a service request signal not containing a paging rejection indication. In this way, in the embodiment of the present disclosure, the time for re-paging the first SIM can be determined based on the directly received service request signaling not containing a paging rejection indication.

It should be noted that those skilled in the art can understand that the methods provided in the embodiments of the present disclosure can be performed separately or together with some methods in the embodiments of the present disclosure or related art.

Figure 3:
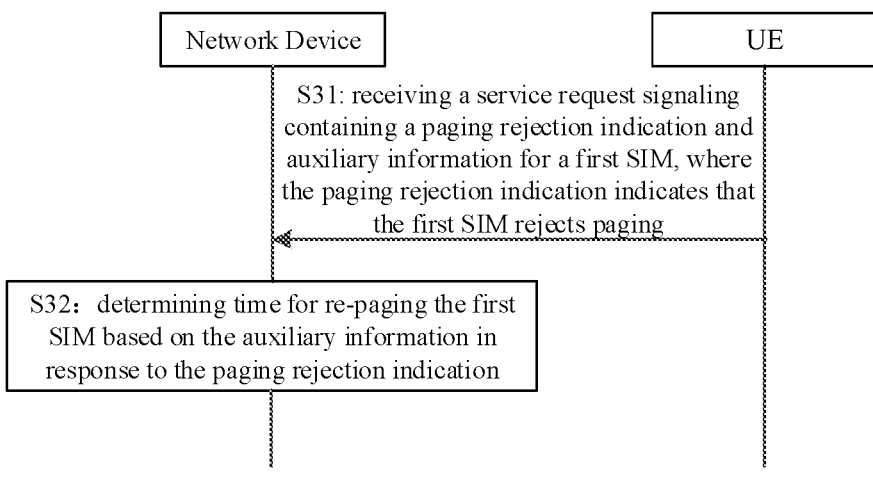
FIG. 3 is a schematic diagram of a processing method for restoring paging based on an exemplary embodiment.

As shown in FIG. 3, the embodiment of the present disclosure provides a processing method for restoring paging, which is executed by a network device, including Step S31, receiving a service request signaling containing a paging rejection indication and auxiliary information from a first SIM, where the paging rejection indication indicates that the first SIM rejects paging; and Step S32, determining time for re-paging the first SIM based on the auxiliary information in response to the paging rejection indication.

In some embodiments of the present disclosure, the first SIM is the first SIM in step S21. The network device refers to any network device in the above embodiments.

In one embodiment, a service request signaling containing the paging rejection indication also includes auxiliary information. This auxiliary information can be used by the network device to determine the time for re-paging the first SIM. The exemplary auxiliary information includes at least one of the following: the paging occasion (PO) for re-paging the first SIM recommended by UE; the interval duration for re-paging the first SIM recommended by UE; the reason for the current paging rejection provided by UE, where the reason corresponds to the interval duration for re-paging; the service information for current paging rejection provided by UE, where the service information can be used to determine the duration required for UE to complete the service that causes UE to reject paging. This service information includes but is not limited to one or more of the following: service execution status, service type and/or service duration, and executed duration.

In one embodiment, the above step S22 includes determining the time for re-paging the first SIM based on the auxiliary information in response to the paging rejection indication.

In the embodiment of the present disclosure, the network device can determine the first SIM rejects paging based on a paging rejection indication and can determine the time for re-paging the first SIM based on auxiliary information by receiving a service request signaling containing the paging rejection indication and the auxiliary information. In this way, the embodiment of the present disclosure does not need to page the first SIM at any time after receiving the service request signaling and before the time for re-paging the first SIM, and can only page the first SIM at the determined time for re-paging the first SIM. This can greatly reduce the number of times of sending incorrect paging by the network device, reduce the error statistics of paging times, and reduce the waste of signaling and other resources.

In the embodiment of the present disclosure, it is possible to receive a paging rejection indication and auxiliary information by receiving a service request signaling for one time, thereby further reducing the waste of signaling and other resources.

Of course, in other embodiments, the paging rejection indication and auxiliary information can also be received separately through service request signaling. For example, the embodiment of the present disclosure provides a processing method for restoring paging, which is executed by a network device, including receiving a service request signal containing a paging rejection indication from a first SIM, where the paging rejection indication indicates that the first SIM rejects paging; receiving a service request signaling containing auxiliary information from the first SIM; and determining time for re-paging the first SIM based on the auxiliary information in response to the paging rejection indication.

In one embodiment, step S31 may be receiving a service request signal of the first SIM containing a paging rejection indication sent by the first SIM of a UE containing multiple SIMs; or receiving a service request signal of the first SIM containing a paging rejection indication and auxiliary information sent by the first SIM of a UE containing multiple SIMs. In this way, in the embodiment of the present disclosure, although the first SIM is in an idle state, it is still possible to obtain a paging rejection indication or a paging rejection indication and auxiliary information based on the service request signaling sent by the first SIM.

In one embodiment, the auxiliary information includes but is not limited to at least one of the following: time information for indicating the interval duration for re-paging the first SIM; and service information for indicating a service of a second SIM that causes the first SIM to reject paging.

In one embodiment, the second SIM is a SIM in a connected state among multiple SIMs of the UE.

For example, the UE involved in this embodiment may be a UE with both a first SIM and a second SIM installed simultaneously. The antenna resources and/or RF links of this UE are limited. If the first SIM responds to paging of the network device while the second SIM is transmitting uplink and downlink information, it may cause interruption of the uplink and downlink information being transmitted by the second SIM. At this point, the first SIM will report the first information, and the signaling length of the first information is small, relative to the first SIM exiting the non-connected state and entering the connected state and interacting with the base station after the connected state. This can reduce the preemption of the antenna resources and/or RF link resources, etc. of the second SIM by the first SIM.

The embodiment of the present disclosure provides a processing method for restoring paging, executed by a network device, which may include: receiving a service request signaling of a first SIM containing a paging rejection indication and time information; and determining time for re-paging the first SIM based on the time information in response to the paging rejection indication.

In one embodiment, the time information can be the time for re-paging the first SIM. Exemplary, if the time information is the first moment, it can be determined that the paging occasion after the first moment and closest to the first moment is the time for re-paging the first SIM.

In the embodiment of the present disclosure, the time for re-paging the first SIM can be directly determined by the time information sent by the UE of multiple SIMs. The determined time for re-paging the first SIM is the time when the UE is expected to monitor paging. In this way, when the network device sends a paging message at the determined time for re-paging the first SIM, it can increase the probability of the first SIM monitoring the paging message.

The embodiment of the present disclosure provides a processing method for restoring paging, executed by a network device, which may include: receiving a service request signaling of a first SIM containing a paging rejection indication and service information; and determining time for re-paging the first SIM based on the service information in response to the paging rejection indication.

In one embodiment, if the network device obtains a service of a second SIM indicating to cause the first SIM to reject paging, the network device can determine the time for re-paging the first SIM based on the end time of the service of the second SIM. For example, if the transmission end time of the service data being transmitted by the second SIM is a second moment, it can be determined that a paging occasion after the second moment and closest to the second moment is the time for re-paging the first SIM, or it can be determined that any time after the second moment is the time for re-paging the first SIM.

In another embodiment, if the service of the second SIM is a periodic service, the network device can determine the time for re-paging the first SIM based on the periodicity of the service of the second SIM. For example, if the service of the second SIM is a periodic service with the first duration as the period, the service of the second SIM will be conducted at a second duration within each first duration, and will stop at the third duration within each first duration, then the network device can determine that any time of the third duration within each first duration is the time for re-paging the first SIM.

In the embodiment of the present disclosure, the time for re-paging the first SIM can be determined based on the service of the second SIM indicating to cause the first SIM to reject paging. This can enable the first SIM of UE to monitor paging messages during the time when the second SIM of UE is not in service, allowing UE to occupy more resources to monitor paging messages. Thus, the probability of the network device successfully paging the first SIM of UE can be increased.

It should be noted that those skilled in the art can understand that the methods provided in the embodiments of the present disclosure can be performed separately or together with some methods in the embodiments of the present disclosure or related art.

Figure 4:
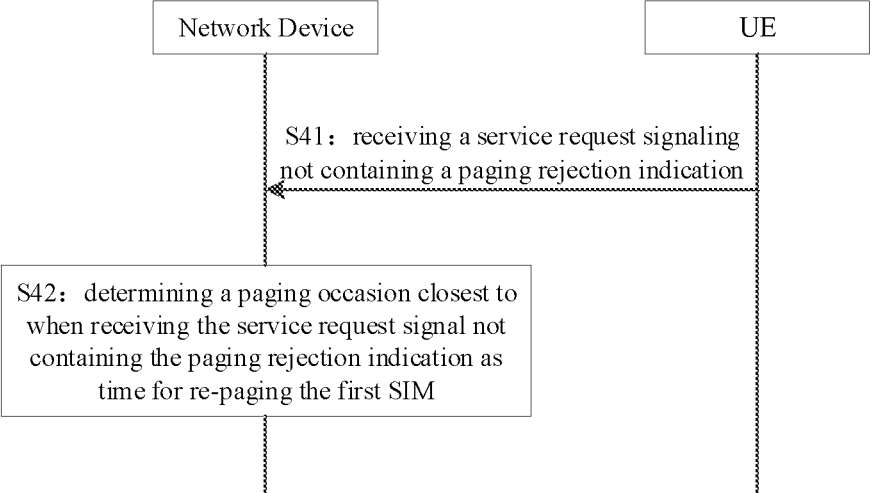
FIG. 4 is a schematic diagram of a processing method for restoring paging based on an exemplary embodiment.

As shown in FIG. 4, the embodiment of the present disclosure provides a processing method for restoring paging, which is executed by a network device, including Step S41, receiving a service request signaling not containing a paging rejection indication; and Step S42, determining a paging occasion closest to when receiving the service request signaling not containing the paging rejection indication as time for re-paging the first SIM.

In some embodiments of the present disclosure, the first SIM is the first SIM in step S21. The network device refers to any network device in the above embodiments.

Specifically, when the first SIM can receive a paging signaling, it sends a service request signaling to the network device that does not include a paging rejection indication. Based on the service request signaling that does not include a paging rejection indication, the network device can determine that the SIM can be paged and the network device can determine the time for paging.

The embodiment of the present disclosure provides a processing method for restoring paging, which is executed by a network device, including receiving a service request signaling not containing a paging rejection indication; and determining a paging occasion closest to when receiving the service request signaling not containing a paging rejection indication as time for re-paging the first SIM based on the service request signaling containing the paging rejection indication.

For example, in some possible embodiments of the present disclosure, the first SIM in an idle state in a multi-card terminal, upon receiving a paging signaling from a network device, decides not to respond to the paging signaling and sends a service request signaling containing a paging rejection indication to the network device. When it can receive the paging signaling, it sends a service request signal not containing a paging rejection indication to the network device. Based on the service request signaling not containing a paging rejection indication, the network device can determine that it can page the SIM.

The embodiment of the present disclosure provides a processing method for restoring paging, which is executed by a network device, including receiving a service request signaling not containing a paging rejection indication; and determining time for re-paging the first SIM based on the service request signaling not containing the paging rejection indication.

In the embodiment of the present disclosure, if the network device receives a service request signaling not containing a paging rejection indication, the network device can determine that the first SIM can monitor paging messages again. In this way, the network device can determine the time for re-paging the first SIM based on the service request signaling not containing the paging rejection indication. In this way, the embodiment of the present disclosure can determine the time for re-paging the first SIM without requiring the service request signaling to carry additional information, thereby reducing the signaling overhead.

In the embodiment of the present disclosure, the network device may determine the nearest paging occasion when receiving a service request signaling not containing a paging rejection indication as the time for re-paging the first SIM. This can enable the network device to re-send paging messages in a timely manner, in order to quickly page the first SIM.

Of course, in other embodiments, the time for re-paging the first SIM can also be determined as any time after receiving a service request signaling not containing a paging rejection indication. For example, a processing method for restoring paging provided in the embodiment of the present disclosure, executed by network devices, may include receiving a service request signaling not containing a paging rejection indication; and determining any time after receiving the service request signaling not containing the paging rejection indication as time for re-paging the first SIM based on a service request signaling containing the paging rejection indication.

It should be noted that those skilled in the art can understand that the methods provided in the embodiments of the present disclosure can be performed separately or together with some methods in the embodiments of the present disclosure or related art.

Figure 5:
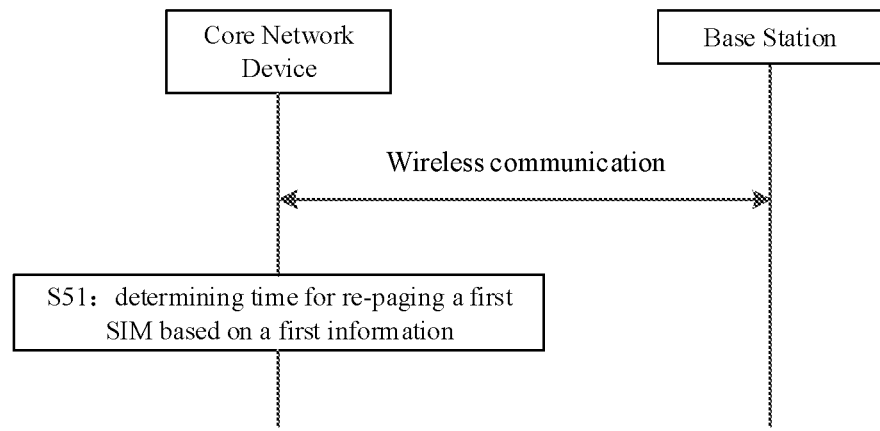
FIG. 5 is a schematic diagram of a processing method for restoring paging based on an exemplary embodiment.

As shown in FIG. 5, the embodiment of the present disclosure provides a processing method for restoring paging, which is executed by a core network device, including Step S51, determining time for re-paging a first SIM based on first information.

In some embodiments of the present disclosure, the first SIM is the first SIM in step S21. The first information is the first information in step S21.

In one embodiment, the first information for the first SIM received by the base station is sent by a UE with multiple SIMs.

The embodiment of the present disclosure provides a processing method for restoring paging, which is executed by a core network device, including receiving a service request signaling of a first SIM containing a paging rejection indication sent by a base station; and determining time for re-paging the first SIM based on the paging rejection indication.

For example, the time for re-paging the first SIM can be a third moment. The core network device can determine the time for re-paging the first SIM as any time after the third moment.

In the embodiment of the present disclosure, the core network device can determine the time for re-paging the first SIM by receiving first information indicating that the first SIM rejects paging. In this way, it can be beneficial for the core network device to re-page the first SIM, thereby increasing the probability of paging to the first SIM of the UE.

In one embodiment, the core network device receives the first information. The core network device determines that the first predetermined bit field used in the first information rejects the paging of the first SIM and triggers the core network device to determine the time for re-paging the first SIM.

In some embodiments, the network device includes a core network device. Step S21 includes receiving the first information for the first SIM sent by the base station; or receiving the first information for the first SIM sent by UE.

The embodiment of the present disclosure provides a processing method for restoring paging, which is executed by the core network device and may include: sending the time for re-paging the first SIM to the base station. The base station here is used to send the time for re-paging the first SIM to a UE with multiple SIMs.

The embodiment of the present disclosure provides a processing method for restoring paging, which is executed by the core network device and may include sending the determined time for re-paging the first SIM to the base station.

In the embodiment of the present disclosure, the core network device can send the time for re-paging the first SIM to the base station, thereby enabling the base station to obtain the first SIM for re-paging the UE. Moreover, since the base station can forward the time for re-paging the first SIM of the core network device to the UE, it can also increase the probability of the first SIM monitoring the paging message when the core network pages the first SIM of the UE.

It should be noted that those skilled in the art can understand that the methods provided in the embodiments of the present disclosure can be performed separately or together with some methods in the embodiments of the present disclosure or related art.

Figure 6:
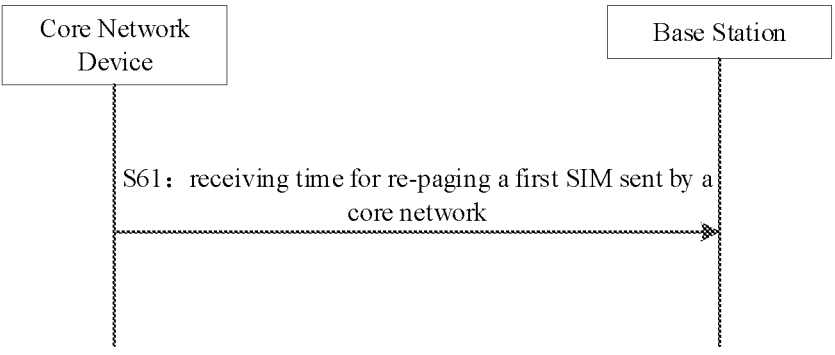
FIG. 6 is a schematic diagram of a processing method for restoring paging based on an exemplary embodiment.

As shown in FIG. 6, the embodiment of the present disclosure provides a processing method for restoring paging, which is executed by a base station, including Step S61, receiving time for re-paging a first SIM sent by a core network.

In some embodiments of the present disclosure, the first SIM is the first SIM in step S21. In some embodiments, the network device includes a base station.

Step S22 includes receiving the time for re-paging the first SIM sent by the core network.

In the embodiment of the present disclosure, the base station can receive the time for re-paging the first SIM sent by the core network, which can facilitate the base station to re-page the first SIM.

The embodiment of the present disclosure provides a processing method for restoring paging, executed by a base station, including sending time for re-paging a first SIM through a RRC signaling. For example, the base station sends the RRC signaling to the first SIM of the UE, and the RRC signaling carries the time for re-paging the first SIM.

In the embodiment of the present disclosure, the base station can send to the UE a time that can be determined to re-page the first SIM, thereby enabling the UE to monitor paging messages at an appropriate time. It can reduce the power consumption of UE and increase the probability of UE monitoring paging messages.

In one embodiment, the RRC signaling is a RRC release signaling.

The embodiment of the present disclosure provides a processing method for restoring paging, executed by a base station, including sending time for re-paging the first SIM through a RRC release signaling. For example, the base station sends the RRC release signaling to the first SIM of the UE, and the RRC release signaling carries the time for re-paging the first SIM.

In the embodiment of the present disclosure, the base station can also send time for re-paging the first SIM through a RRC release signaling, thereby releasing the connection between the base station and the UE through the RRC release signaling and simultaneously sending the time for re-paging the first SIM to the UE. This can reduce the transmission of signaling and improve the utilization rate of signaling. Moreover, since in this application, the base station sends the time for re-paging the first SIM to the first SIM of the UE through the RRC release signaling, it can ensure that the first SIM of the UE is in an idle state, thereby further reducing the power consumption of the UE and facilitating the UE to monitor paging messages at the determined time for re-paging the first SIM.

It should be noted that those skilled in the art can understand that the methods provided in the embodiments of the present disclosure can be performed separately or together with some methods in the embodiments of the present disclosure or related art.

Figure 7:
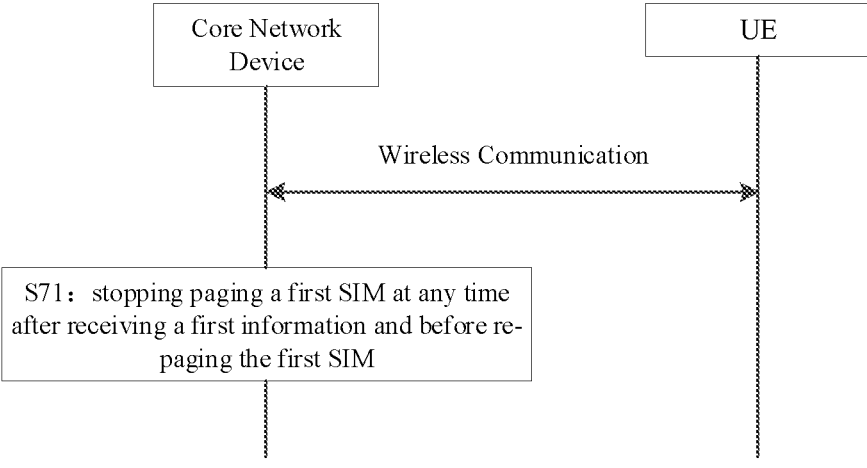
FIG. 7 is a schematic diagram of a processing method for restoring paging based on an exemplary embodiment.

As shown in FIG. 7, the embodiment of the present disclosure provides a processing method for restoring paging, which is executed by a network device, including Step S71, stopping paging a first SIM at any time after receiving first information and before re-paging the first SIM.

In some embodiments of the present disclosure, the first SIM is the first SIM in step S21. The first information is the first information in step S21. The network device is a core network device or a base station.

In one embodiment, stopping paging the first SIM in step S71 can be stopping sending paging messages to the first SIM.

The embodiment of the present disclosure provides a processing method for restoring paging, which is executed by a network device, including stopping paging the first SIM at any paging occasion after receiving the first information and before re-paging the first SIM.

The embodiment of the present disclosure provides a processing method for restoring paging, which is executed by a network device, including sending a paging message at the time of re-paging the first SIM.

In the embodiment of the present disclosure, the network device can reduce the number of times of sending incorrect paging and save energy consumption of the network device by stopping paging the first SIM at any time after receiving the first information and before re-paging the first SIM.

In the embodiment of the present disclosure, if a paging message is sent at the time for re-paging the first SIM, the UE can also monitor the paging message at the time for re-paging the first SIM, thereby greatly increasing the probability of UE monitoring paging messages.

It should be noted that those skilled in the art can understand that the methods provided in the embodiments of the present disclosure can be performed separately or together with some methods in the embodiments of the present disclosure or related art.

The following processing method for restoring paging is executed by UE, similar to the description of the processing method for restoring paging executed by the network device mentioned above. Moreover, for the technical details not disclosed in the embodiments of the processing method for restoring paging executed by UE, please refer to the description of the example of the processing method for restoring paging executed by network device, which will not be described in detail here.

Figure 8:
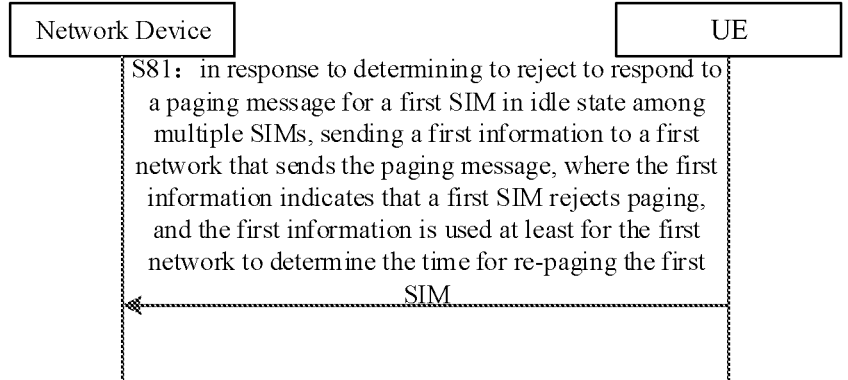
FIG. 8 is a schematic diagram of a processing method for restoring paging based on an exemplary embodiment.

As shown in FIG. 8, the embodiment of the present disclosure provides a processing method for restoring paging, which is executed by a UE with multiple SIMs, including Step S81, sending, in response to determining to reject to respond to a paging message for a first SIM in idle state among multiple SIMs, first information to a first network that sends the paging message, where the first information indicates that a first SIM reject paging, and the first information is used at least for the first network to determine the time for re-paging the first SIM.

In one embodiment, the UE includes multiple SIMs. The multiple SIMs include at least the first SIM in idle mode. In another embodiment, the UE includes multiple SIMs. The multiple SIMs include the first SIM in idle mode and the second SIM in connected mode.

In one embodiment, the first network includes network devices. The network devices include a core network device and/or a base station.

In the embodiment of the present disclosure, the UE determines to reject to respond to a paging message for the first SIM in an idle state among multiple SIMs, and sends first information to a first network that sends the paging message, where the first information indicates that the first SIM rejects paging. This can enable the first network to determine that the first SIM rejects the paging message, and can also enable the first network to determine time for re-paging the first SIM. In this way, the first SIM does not need to monitor paging between sending the first information and the time determined by the first network to re-page the first SIM. On the one hand, it can greatly reduce the number of times the first network sends paging messages and reduce the waste of signaling and other resources. On the other hand, it can greatly reduce the number of times UE monitor paging messages and reduce the power consumption of UE, etc.

The embodiment of the present disclosure provides a processing method for restoring paging, which is executed by a UE with multiple SIMs and may include sending first information to a base station that sends a paging message for the first SIM in an idle state among multiple SIMs in response to determining to reject to respond to the paging message, wherein the first information indicates that a first SIM rejects paging, the first information is at least used for the first network to determine the time for re-paging the first SIM. The base station here can be the base station of the first network.

The embodiment of the present disclosure provides a processing method for restoring paging, which is executed by a UE with multiple SIMs and may include sending first information to a core network device that sent a paging message for the first SIM in an idle state among multiple SIMs in response to determining to reject to respond to the paging message, where the first information indicates that the first SIM rejects paging, and the first information is at least used for a first network to determine the time for re-paging the first SIM. The core network device here can be the core network device of the first network.

In one embodiment, the first information includes a service request signaling containing a paging rejection indication, where the paging rejection indication indicates that the first SIM rejects paging.

The embodiment of the present disclosure provides a processing method for restoring paging, which is executed by a UE with multiple SIMs and may include sending a service request signaling containing a paging rejection indication to the base station that sent a paging message for the first SIM in an idle state among multiple SIMs in response to determining to reject to respond to the paging message, where the paging rejection indication indicates that the first SIM rejects paging. The service request signaling containing the paging rejection indication is used by the first network to determine the time for re-paging the first SIM.

In another embodiment, the first information includes a service request signaling containing a paging rejection indication and auxiliary information. The paging rejection indication indicates that the first SIM rejects paging. The auxiliary information is used to determine the time for re-paging the first SIM.

The embodiment of the present disclosure provides a processing method for restoring paging, which is executed by a UE with multiple SIMs and may include sending a service request signaling not containing a paging rejection indication. The service request signaling not containing the paging rejection indication is used to determine the time for re-paging the first SIM.

The embodiment of the present disclosure provides a processing method for restoring paging, which is executed by a UE with multiple SIMs and may include sending a service request signaling containing a paging rejection indication and auxiliary information to a base station that sent a paging message for the first SIM in an idle state among multiple SIMs in response to determining to reject to respond to the paging message, where the paging rejection indication indicates that the first SIM rejects paging; and the auxiliary information is used by a first network to determine the time for re-paging the first SIM.

In one embodiment, the auxiliary information includes at least one of the following: time information for indicating the interval duration for re-paging the first SIM; and service information for indicating a service of a second SIM that causes the first SIM to reject paging.

The embodiment of the present disclosure provides a processing method for restoring paging, which is executed by a UE with multiple SIMs, and may include sending a service request signaling containing a paging rejection indication and time information to a base station that sent a paging message for the first SIM in an idle state among multiple SIMs in response to determining to reject to respond to the paging message, where the paging rejection indication indicates that the first SIM rejects paging; and the time information is used by a first network to determine the time for re-paging the first SIM.

The embodiment of the present disclosure provides a processing method for restoring paging, which is executed by a UE with multiple SIMs and may include sending a service request signaling containing a paging rejection indication and service information to a base station that sent a paging message for the first SIM in an idle state among multiple SIMs in response to determining to reject to respond to the paging message, where the paging rejection indication indicates that the first SIM rejects paging; and the service information is used by a first network to determine the time for re-paging the first SIM.

The embodiment of the present disclosure provides a processing method for restoring paging, which is executed by a UE with multiple SIMs and may include sending a service request signaling not containing a paging rejection indication after sending a service request signaling containing a paging rejection indication; where the service request signaling not containing the paging rejection indication is used by a first network to determine the time for re-paging the first SIM after the service request signaling containing the paging rejection indication.

The embodiment of the present disclosure provides a processing method for restoring paging, which is executed by a UE with multiple SIMs and may include receiving the time for re-paging the first SIM sent by a base station through a RRC signaling.

In one embodiment, the RRC signaling is RRC release signaling.

The embodiment of the present disclosure provides a processing method for restoring paging, which is executed by a UE with multiple SIMs and may include receiving the time for re-paging the first SIM sent by a base station through the RRC release signaling.

The embodiment of the present disclosure provides a processing method for restoring paging, which is executed by a UE with multiple SIMs and may include stopping monitoring paging messages at any time after sending the first information and before a determined time for receiving the paging message again.

The embodiment of the present disclosure provides a processing method for restoring paging, which is executed by a UE with multiple SIMs and may include receiving a paging message sent by the first network at a determined time for re-paging the first SIM.

It should be noted that those skilled in the art can understand that the methods provided in the embodiments of the present disclosure can be performed separately or together with some methods in the embodiments of the present disclosure or related art.

In order to further explain any embodiment of the present disclosure, the following specific examples are also provided:

Example 1

Figures 9, 10:
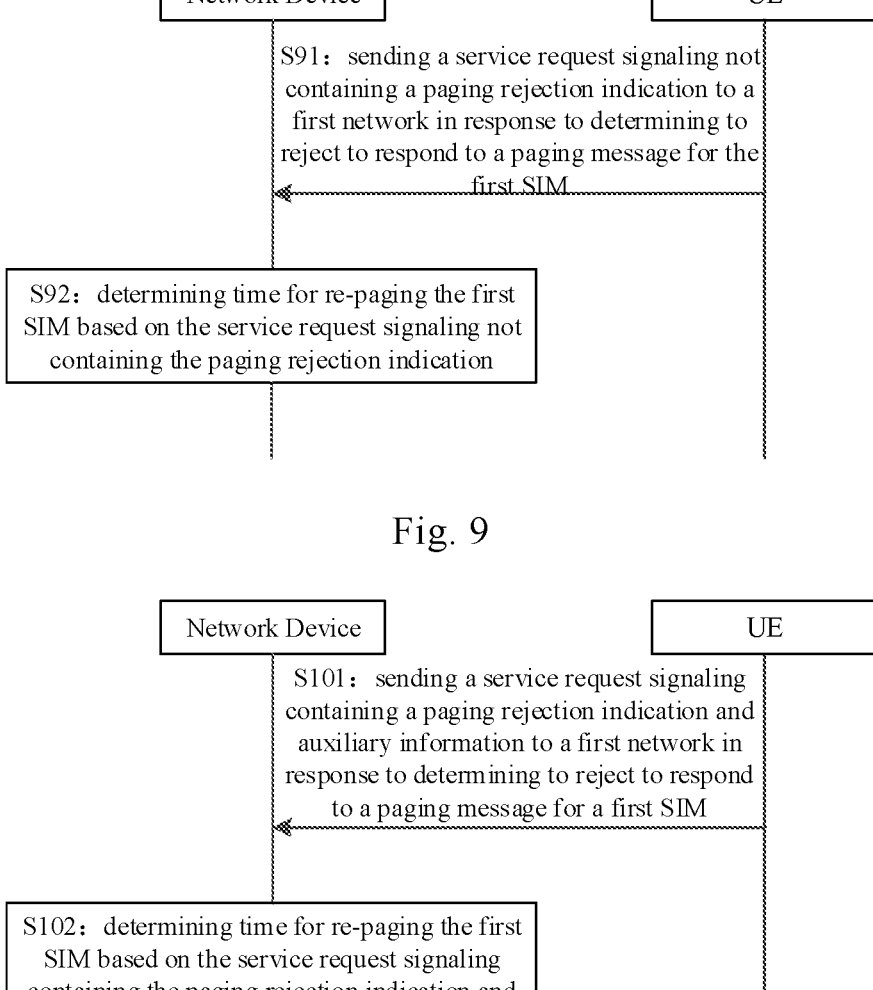
FIG. 9 is a schematic diagram of a processing method for restoring paging based on an exemplary embodiment.
FIG. 10 is a schematic diagram of a processing method for restoring paging according to an exemplary embodiment.

As shown in FIG. 9, the embodiment of the present disclosure provides a processing method for restoring paging, which is executed by a communication device. The communication device includes a network device or UE. The method includes the following step.

Step S91: sending a service request signaling not containing a paging rejection indication to a first network in response to determining to reject to respond to a paging message for the first SIM.

In an optional embodiment, a UE with multiple SIMs receives a paging message sent by the first network and determines to reject to respond to the paging message for the first SIM. The UE sends a service request signaling not containing a paging rejection indication to the first network. The paging rejection indication indicates that the first SIM rejects paging.

In another optional embodiment, a UE with multiple SIMs receives a paging message sent by the first network and determines to reject to respond to the paging message for the first SIM. The UE sends a service request signaling containing a paging rejection indication to the first network. After sending the service request signaling containing the paging rejection indication to the first network, UE sends a service request signaling not containing the paging rejection indication to the first network.

Step S92: determining time for re-paging the first SIM based on the service request signaling not containing the paging rejection indication.

In an optional embodiment, in response to receiving a service request signaling not containing a paging rejection indication after receiving a service request signaling containing the paging rejection indication, the network device determines the time for re-paging the first SIM based on the time of receiving the service request signaling not containing the paging rejection indication.

In one embodiment, the network devices include a base station and a core network device.

In the embodiment of the present disclosure, if the network device receives a service request signaling not containing a paging rejection indication, the network device can determine that the first SIM can monitor paging messages again. In this way, the network device can determine the time for re-paging the first SIM based on the service request signaling not containing the paging rejection indication. Thus, the network device does not need to page the first SIM before the time for re-paging the first SIM, which can reduce the number of times of incorrect paging and the waste of signaling resources.

It should be noted that those skilled in the art can understand that the methods provided in the embodiments of the present disclosure can be performed separately or together with some methods in the embodiments of the present disclosure or related art.

Example 2

As shown in FIG. 10, the embodiment of the present disclosure provides a processing method for restoring paging, which is executed by a communication device. The communication device includes network device or UE, and the method includes the following steps.

Step S101: sending a service request signaling containing a paging rejection indication and auxiliary information to a first network in response to determining to reject to respond to a paging message for a first SIM.

In an optional embodiment, a UE with multiple SIMs receives a paging message sent by the first network and determines to reject to respond to the paging message for the first SIM. The UE sends a service request signaling containing a paging rejection indication and auxiliary information to the first network. The paging rejection indication indicates that the first SIM rejects paging. The auxiliary information is used for the first network to determine the time for re-paging the first SIM.

In one embodiment, the auxiliary information includes at least one of the following: time information for indicating the interval duration for re-paging the first SIM; and service information for indicating a service of a second SIM that causes the first SIM to reject paging.

Step S102: determining time for re-paging the first SIM based on the service request signaling containing the paging rejection indication and auxiliary information.

In an optional embodiment, the network device determines time for re-paging a first SIM based on the auxiliary information in the service request signaling in response to the paging rejection indication in the service request signaling.

In one embodiment, the network devices include a base station and a core network device.

In the embodiment of the present disclosure, the network device does not need to page the first SIM at any time after receiving the service request signaling and before the time for re-paging the first SIM, and thus can only page the first SIM at the determined time for re-paging the first SIM. This can greatly reduce the number of times of sending incorrect paging by the network device, reduce the error statistics of the paging times, and reduce the waste of signaling and other resources.

In the embodiment of the present disclosure, it is possible to receive a paging rejection indication and auxiliary information by receiving a service request signaling for one time, thereby further reducing the waste of signaling and other resources.

It should be noted that those skilled in the art can understand that the methods provided in the embodiments of the present disclosure can be performed separately or together with some methods in the embodiments of the present disclosure or related art.

Example 3

Figure 11:
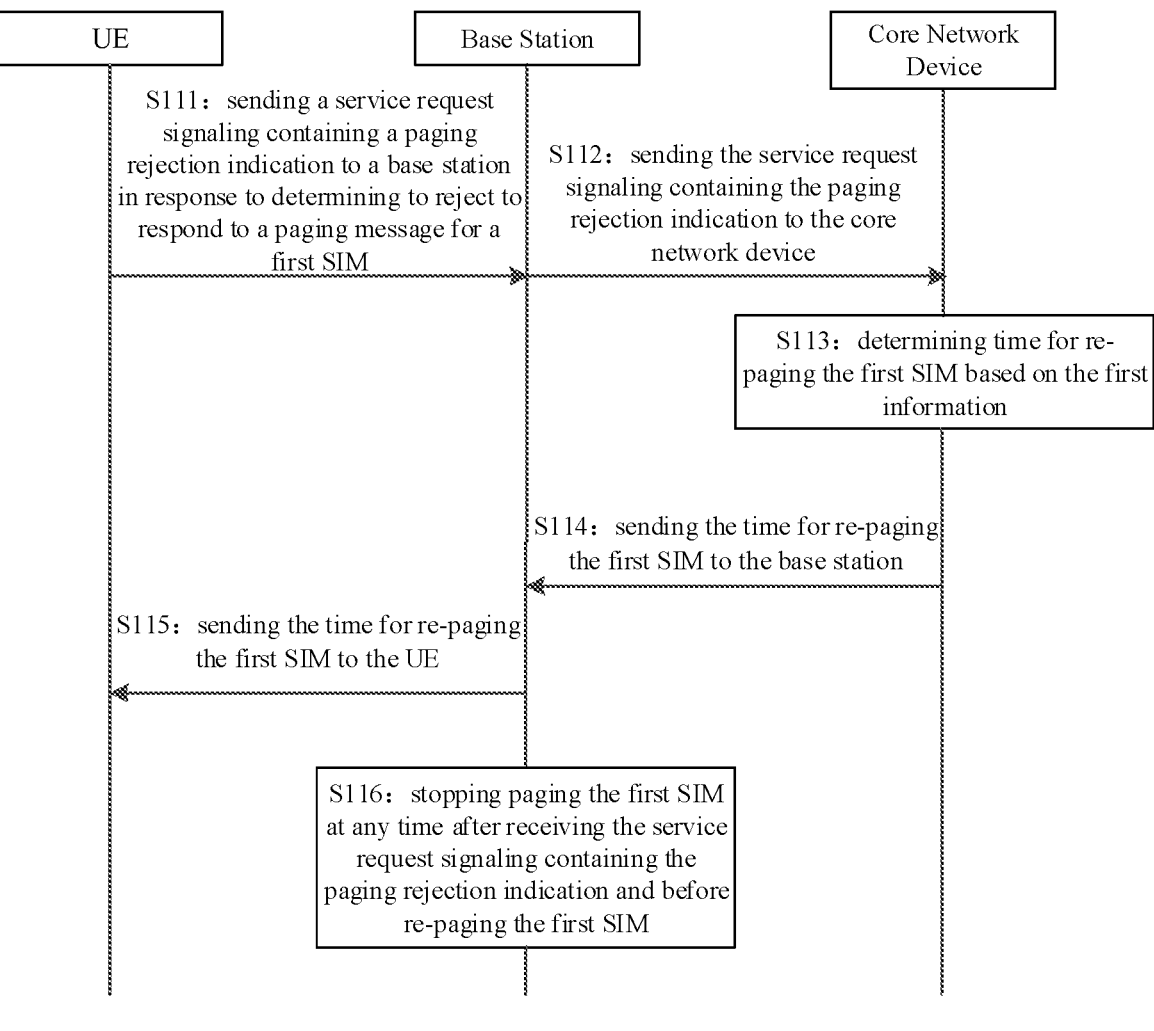
FIG. 11 is a schematic diagram of a processing method for restoring paging according to an exemplary embodiment.

As shown in FIG. 11, the embodiment of the present disclosure provides a processing method for restoring paging, which is executed by a communication device. The communication device includes a network device or UE, and the method includes the following steps.

Step S111: sending a service request signaling containing a paging rejection indication to a base station in response to determining to reject to respond to a paging message for a first SIM.

In an optional embodiment, a UE with multiple SIMs receives a paging message sent by the first network and determines to reject to respond to the paging message for the first SIM. The UE sends a service request signaling containing a paging rejection indication to the base station. The paging rejection indication indicates that the first SIM rejects paging.

Step S112: sending the service request signaling containing the paging rejection indication to the core network device.

In an optional embodiment, the base station sends the service request signaling containing the paging rejection indication to the core network device.

Step S113: determining time for re-paging the first SIM based on the first information.

In an optional embodiment, the core network device determines the time for re-paging the first SIM based on the first information.

Step S114: sending the time for re-paging the first SIM to the base station.

In an optional embodiment, the core network device sends the time for re-paging the first SIM to the base station.

Step S115: sending the time for re-paging the first SIM to the UE.

In an optional embodiment, the base station sends the time for re-paging the first SIM to the UE.

Step S116: stopping paging the first SIM at any time after receiving the service request signaling containing the paging rejection indication and before re-paging the first SIM.

In an optional embodiment, the base station stops sending paging messages to the first SIM at any time after receiving the service request signal containing the paging rejection indication and before re-paging the first SIM.

In another optional embodiment, the base station sends a paging message to the first SIM at the time for re-paging the first SIM.

In the embodiment of the present disclosure, the time for re-paging the first SIM can be determined by the core network device based on the received service request signaling containing a paging rejection indication. The time for re-paging the first SIM is sent to the base station. The base station forwards the time for re-paging the first SIM from the core network device to the UE. On the one hand, the network device does not need to page the first SIM at any time after receiving the service request signaling and before the time for re-paging the first SIM, thereby greatly reducing the number of times of sending incorrect paging by the network device, reducing the error statistics of paging times, as well as reducing the waste of signaling and other resources. On the other hand, it can also enable network devices to page the first SIM at the time for re-paging the first SIM, and the UE can monitor the paging at that time, thereby increasing the probability of the network device paging to the first SIM and the first SIM monitoring the paging.

It should be noted that those skilled in the art can understand that the methods provided in the embodiments of the present disclosure can be performed separately or together with some methods in the embodiments of the present disclosure or related art.

Figure 12:
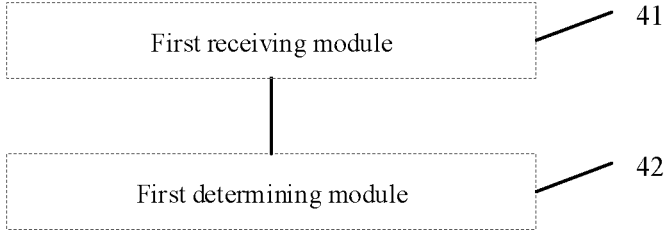
FIG. 12 is a block diagram of a processing device for restoring paging according to an exemplary embodiment.

As shown in FIG. 12, a processing device for restoring paging is provided, applied to a network device. The processing device may include the following modules.

A first receiving module 41 is configured to receive first information for a first SIM.

A first determining module 42 is configured to determine time for re-paging the first SIM in response to the first information indicating that the first SIM rejects paging.

In one embodiment, the network device include: a base station or a core network device.

In one embodiment, the first information includes a service request signaling containing a paging rejection indication, where the paging rejection indication indicates the first SIM rejects paging.

The embodiment of the present disclosure provides a processing device for restoring paging, applied to a network device. The processing device may include the following modules.

A first receiving module 41 is configured to receive a service request signaling containing a paging rejection indication from a first SIM, where the paging rejection indication indicates that the first SIM rejects paging.

A first determining module 42 is configured to determine time for re-paging the first SIM in response to the service request signaling indicating that the first SIM rejects paging.

In one embodiment, the service request signaling containing the paging rejection indication also includes auxiliary information.

The first determining module 42 is configured to determine the time for re-paging the first SIM based on the auxiliary information in response to the paging rejection indication.

The embodiment of the present disclosure provides a processing device for restoring paging, applied to a network device. The processing device may include the following modules.

A first receiving module 41 is configured to receive a service request signaling containing a paging rejection indication and auxiliary information from a first SIM, where the paging rejection indication indicates that the first SIM rejects paging.

A first determining module 42 is configured to determine time for re-paging the first SIM based on the auxiliary information in response to the paging rejection indication.

In one embodiment, the auxiliary information includes at least one of the following: time information for indicating the interval duration for re-paging the first SIM; and service information for indicating a service of a second SIM that causes the first SIM to reject paging.

The embodiment of the present disclosure provides a processing device for restoring paging, applied to a network device. The processing device may include the following modules.

A first receiving module 41 is configured to receive a service request signaling containing a paging rejection indication and time information from the first SIM, where the paging rejection indication indicates that the first SIM rejects paging.

A first determining module 42 is configured to determine time for re-paging the first SIM based on the time information in response to the paging rejection indication.

The embodiment of the present disclosure provides a processing device for restoring paging, applied to a network device. The processing device may include the following modules.

A first receiving module 41 is configured to receive a service request signaling containing a paging rejection indication and service information from a first SIM, where the paging rejection indication indicates that the first SIM rejects paging.

A first determining module 42 is configured to determine time for re-paging the first SIM based on the service information in response to the paging rejection indication.

The embodiment of the present disclosure provides a processing device for restoring paging, applied to a network device. The processing device may include the following modules.

A first receiving module 41 is configured to receive a service request signaling not containing a paging rejection indication.

A first determining module 42 is configured to determine a paging occasion closest to when receiving the service request signaling not containing the paging rejection indication as the time for re-paging the first SIM based on the service request signaling containing the paging rejection indication.

The embodiment of the present disclosure provides a processing device for restoring paging, applied to a network device. The processing device may include a first determining module 42 configured to determine a paging occasion closest to when receiving a service request signaling not containing a paging rejection indication as the time for re-paging the first SIM.

The embodiment of the present disclosure provides a processing device for restoring paging, applied to a core network device. The processing device may include a first determination module 42 configured to determine the time for re-paging the first SIM based on the first information.

The embodiment of the present disclosure provides a processing device for restoring paging, applied to a core network device. The processing device may include a first receiving module 41 configured to receive first information for a first SIM sent by a base station; or a first receiving module 41 configured to receive first information for a first SIM sent by a UE.

Figure 13:
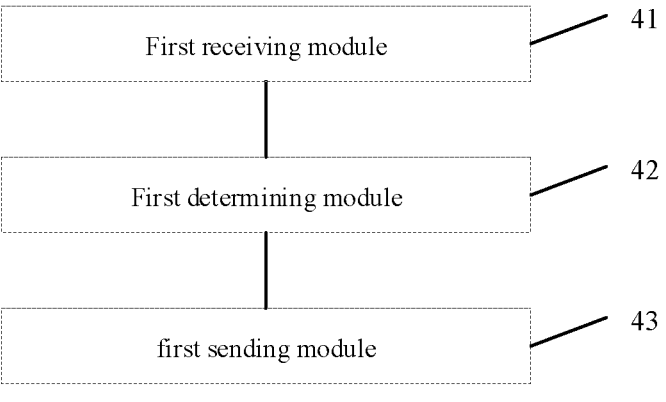
FIG. 13 is a block diagram of a processing device for restoring paging according to an exemplary embodiment.

As shown in FIG. 13, a processing device for restoring paging is provided, applied to a core network device. The processing device may include a first sending module 43 configured to send time for re-paging the first SIM to the base station.

The embodiment of the present disclosure provides a processing device for restoring paging, applied to a base station. The processing device may include a first receiving module 41 configured to receive time for re-paging a first SIM sent by a core network.

The embodiment of the present disclosure provides a processing device for restoring paging, applied to a base station. The processing device may include a first sending module 43 configured to send time for re-paging the first SIM through a RRC signaling.

In one embodiment, the RRC signaling is a RRC release signaling.

The embodiment of the present disclosure provides a processing device for restoring paging, applied to a base station. The processing device may include a first transmission module 43 configured to send a time for re-paging the first SIM through a RRC release signaling.

The embodiment of the present disclosure provides a processing device for restoring paging, applied to a base station. The processing device may include a first determining module 42 configured to stop paging the first SIM at any time after receiving the first information and before re-paging the first SIM.

The embodiment of the present disclosure provides a processing device for restoring paging, applied to a base station. The processing device may include a first receiving module 41 configured to receive the first information for the first SIM sent by the UE.

It should be noted that those skilled in the art can understand that the devices provided in the embodiments of the present disclosure can be executed separately or together with some devices in the embodiments of the present disclosure or related art.

Regarding the device in the above embodiments, the specific ways in which each module performs operations have been described in detail in the relevant embodiments of the method, and will not be elaborated here.

As shown in FIG. 14, a processing device for restoring paging is provided, applied to a UE with multiple SIMs. The processing device may include a second sending module 61 configured to send first information to a first network that sent a paging message for the first SIM in an idle state among multiple SIMs in response to determining to reject to respond to the paging message, where the first information indicates that the first SIM rejects paging. The first information is used at least for the first network to determine the time for re-paging the first SIM.

In one embodiment, the first information includes a service request signaling containing a paging rejection indication, where the paging rejection indication indicates that the first SIM rejects paging.

The embodiment of the present disclosure provides a processing device for restoring paging, applied to a UE with multiple SIMs. The processing device may include a second sending module 61 configured to send a service request signaling containing a paging rejection indication to the first network that sends a paging message for the first SIM in an idle state among multiple SIMs in response to determining to reject to respond to the paging message. The paging rejection indication indicates that the first SIM rejects paging. The service request signaling containing the paging rejection indication is used at least for the first network to determine the time for re-paging the first SIM.

In one embodiment, the service request signaling containing the paging rejection indication also includes auxiliary information. The auxiliary information is used by the first network to determine the time for re-paging the first SIM.

The embodiment of the present disclosure provides a processing device for restoring paging, applied to a UE with multiple SIMs. The processing device may include a second sending module 61 configured to send a service request signaling containing a paging rejection indication and service information to the first network that sends a paging message for the first SIM in an idle state among multiple SIMs in response to determining to reject to respond to the paging message. The paging rejection indication indicates that the first SIM rejects paging. The auxiliary information is at least used for the first network to determine the time for re-paging the first SIM.

In one embodiment, the auxiliary information includes at least one of the following: time information for indicating the interval duration for re-paging the first SIM; and service information for indicating a service of a second SIM that causes the first SIM to reject paging.

The embodiment of the present disclosure provides a processing device for restoring paging, applied to a UE with multiple SIMs. The processing device may include a second sending module 61 configured to send a service request signaling containing a paging rejection indication and time information to the first network that sends a paging message for the first SIM in an idle state among multiple SIMs in response to determining to reject to respond to the paging message. The paging rejection indication indicates that the first SIM rejects paging. The time information is at least used for the first network to determine the time for re-paging the first SIM.

The embodiment of the present disclosure provides a processing device for restoring paging, applied to a UE with multiple SIMs. The processing device may include a second sending module 61 configured to send a service request signaling containing a paging rejection indication and service information to the first network that sends a paging message for the first SIM in an idle state among multiple SIMs in response to determining to reject to respond to the paging message. The paging rejection indication indicates that the first SIM rejects paging. The service information is at least used for the first network to determine the time for re-paging the first SIM.

The embodiment of the present disclosure provides a processing device for restoring paging, applied to a UE with multiple SIMs. The processing device may include a second sending module 61 configured to send a service request signaling not containing a paging rejection indication. The service request signaling not containing the paging rejection indication is used to determine the time for re-paging the first SIM.

The embodiment of the present disclosure provides a processing device for restoring paging, applied to a UE with multiple SIMs. The processing device may include a second sending module 61 configured to send a service request signaling not containing a paging rejection indication after sending a service request signaling containing the paging rejection indication. The service request signaling not containing the paging rejection indication is used by the first network to determine the time for re-paging the first SIM after the service request signaling containing the paging rejection indication.

As shown in FIG. 15, a processing device for restoring paging, applied to a UE with multiple SIMs, may include a second receiving module 62 configured to receive the time for re-paging the first SIM sent through a RRC signaling.

The embodiment of the present disclosure provides a processing device for restoring paging, applied to a UE with multiple SIMs. The processing device may include a second receiving module 62 configured to receive the time for re-paging the first SIM sent by the base station through RRC signaling.

In one embodiment, the RRC signaling is a RRC release signaling.

The embodiment of the present disclosure provides a processing device for restoring paging, applied to a UE with multiple SIMs. The processing device may include a second receiving module 62 configured to receive the time for re-paging the first SIM sent through the RRC release signaling.

The embodiment of the present disclosure provides a processing device for restoring paging, applied to a UE with multiple SIMs. The processing device may include a second sending module 61 configured to send first information to a core network device or a base station of the first network that sends the paging message, where the first information indicates that the first SIM rejects paging.

It should be noted that those skilled in the art can understand that the devices provided in the embodiments of the present disclosure can be executed separately or together with some devices in the embodiments of the present disclosure or related art.

Regarding the device in the above embodiments, the specific ways in which each module performs operations have been described in detail in the relevant embodiments of the method, and will not be elaborated here.

The embodiment of the present disclosure provides a communication device, including: a processor; a memory configured to store processor-executable instructions; where the processor is configured to implement a processing method for restoring paging of any embodiment of the present disclosure when running executable instructions.

In one embodiment, the communication device may be a network device or UE. The network device can be a base station or a core network device. The UE can be a UE with multiple SIMs.

The processor may include various types of storage media, which are non-temporary computer storage media that can continue to remember and store information on the user equipment after it loses power.

The processor can be connected to the memory through a bus or other means for reading executable programs stored on the memory, for example, at least one of the methods shown in FIGS. 2 to 11.

The embodiment of the present disclosure also provides a computer storage medium, which stores a computer executable program. When the executable program is executed by a processor, a processing method for restoring paging in any embodiment of the present disclosure, for example, at least one of the methods shown in FIGS. 2 to 11, is implemented.

The specific ways in which each module performs operations regarding the device or storage medium in the above embodiments have been described in detail in the relevant embodiments of the method, and will not be elaborated here.

FIG. 16 is a block diagram of user equipment 800 according to an exemplary embodiment. For example, the user equipment 800 can be a mobile phone, a computer, digital broadcasting user equipment, a messaging device, a game console, a tablet device, a medical device, a fitness device, a personal digital assistant, etc.

Referring to FIG. 16, the user equipment 800 may include one or more of the following components: a processing component 802, a memory 804, a power component 806, a multimedia component 808, an audio component 810, an input/output (I/O) interface 812, a sensor component 814, and a communication component 816.

The processing component 802 typically controls the overall operation of the user equipment 800, such as operations associated with display, telephone calls, data communication, camera operations, and recording operations. The processing component 802 may include one or more processors 820 to execute instructions to complete all or part of the steps of the above method. In addition, the processing component 802 may include one or more modules to facilitate the interaction between the processing component 802 and other components. For example, the processing component 802 may include a multimedia module to facilitate interaction between the multimedia component 808 and the processing component 802.

The memory 804 is configured to store various types of data to support operations on the user equipment 800. Examples of these data include instructions for any application or method used to operate on the user equipment 800, contact data, phone book data, messages, images, videos, etc. The memory 804 can be implemented by any type of volatile or non-volatile storage device or their combination, such as static random access memory (SRAM), electrically erasable programmable read-only memory (EEPROM), erasable programmable read-only memory (EPROM), programmable read only memory (PROM), read-only memory (ROM), magnetic memory, flash memory, magnetic disk or optical disc.

The power component 806 provides power to various components of the user equipment 800. The power component 806 may include a power management system, one or more power sources, and other components associated with generating, managing, and distributing power for the user equipment 800.

The multimedia component 808 includes a screen providing an output interface between the user equipment 800 and the user. In some embodiments, the screen may include a liquid crystal display (LCD) and a touch panel (TP). If the screen includes a touch panel, the screen can be implemented as a touch screen to receive input signals from the user. The touch panel includes one or more touch sensors to sense touch, sliding, and gestures on the touch panel. The touch sensor can not only sense the boundaries of touch or sliding actions, but also detect the duration and pressure associated with the touch or sliding operation. In some embodiments, the multimedia component 808 includes a front camera and/or a rear camera. When the user equipment 800 is in operation mode, such as shooting mode or video mode, the front camera and/or rear camera can receive external multimedia data. Each front and rear camera can be a fixed optical lens system or have focal length and optical zoom capabilities.

The audio component 810 is configured to output and/or input audio signals. For example, the audio component 810 includes a microphone (MIC) configured to receive external audio signals when the user equipment 800 is in operating modes such as call mode, recording mode, and speech recognition mode. The received audio signal can be further stored in the memory 804 or transmitted through the communication component 816. In some embodiments, the audio component 810 also includes a speaker for outputting audio signals.

The I/O interface 812 provides an interface between the processing component 802 and peripheral interface modules, which can be keyboards, click wheels, buttons, etc. These buttons may include but are not limited to: home button, volume button, start button, and lock button.

The sensor component 814 includes one or more sensors for providing state evaluations of various aspects for the user equipment 800. For example, the sensor component 814 can detect the open/closed status of the user equipment 800, the relative positioning of components, such as the display and keyboard of the user equipment 800. The sensor component 814 can also detect changes in the position of the user equipment 800 or one component of the user equipment 800, the presence or absence of contact between the user and the user equipment 800, the orientation or acceleration/deceleration of the user equipment 800, and temperature changes of the user equipment 800. The sensor component 814 may include a proximity sensor configured to detect the presence of nearby objects without any physical contact. The sensor component 814 may also include optical sensors, such as CMOS or CCD image sensors, for use in imaging applications. In some embodiments, the sensor component 814 may also include an accelerometer, a gyroscope sensor, a magnetic sensor, a pressure sensor, or a temperature sensor.

The communication component 816 is configured to facilitate wired or wireless communication between the user equipment 800 and other devices. The user equipment 800 can access a wireless network based on communication standards, such as WiFi, 2G or 3G, or a combination of them. In an exemplary embodiment, the communication component 816 receives broadcast signals or broadcast related information from an external broadcast management system via a broadcast channel. In an exemplary embodiment, the communication component 816 further includes a near-field communication (NFC) module to facilitate short-range communication. For example, the NFC module can be implemented based on radio frequency identification (RFID) technology, infrared data association (IrDA) technology, ultra wideband (UWB) technology, Bluetooth (BT) technology, and other technologies.

In exemplary embodiments, the user equipment 800 may be implemented by one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors, or other electronic components to perform the aforementioned methods.

In exemplary embodiments, there is also provided a non-temporary computer-readable storage medium including instructions, such as a memory 804 including instructions. The instructions can be executed by the processor 820 of the user equipment 800 to complete the above method. For example, the non-temporary computer-readable storage medium may be ROM, random access memory (RAM), CD-ROM, magnetic tape, floppy disk, optical data storage device, etc.

As shown in FIG. 17, an embodiment of the present disclosure illustrates a structure of a base station. For example, the base station 900 can be provided as a network side device. Referring to FIG. 17, the base station 900 includes a processing component 922, which further includes one or more processors, as well as memory resources represented by the memory 932, for storing instructions that can be executed by the processing component 922, such as application programs. The application programs stored in the memory 932 may include one or more modules corresponding to a set of instructions. In addition, the processing component 922 is configured to execute instructions to execute any of the aforementioned methods applied to the base station, such as the methods shown in FIGS. 4 to 10.

The base station 900 may also include a power component 926 configured to perform power management of the base station 900, a wired or wireless network interface 950 configured to connect the base station 900 to the network, and an input output (I/O) interface 958. The base station 900 can operate an operating system stored in the memory 932, such as Windows Server™, Mac OS X™, Unix™, Linux™, FreeBSD™, etc.

Those skilled in the art will easily come up with other embodiments of the present disclosure after considering the specification and practicing the disclosure herein. The disclosure aims to cover any variations, uses, or adaptive changes of the present disclosure, which follow the general principles of the present disclosure and include common knowledge or customary technical means in the technical field not disclosed herein. The specification and embodiments are only considered exemplary.

It should be understood that the present disclosure is not limited to the precise structure described above and shown in the drawings, and various modifications and changes can be made without departing from its scope.

What is claimed is:

1. A processing method for restoring paging, performed by a network device, comprising:

receiving first information for a first subscriber identity module (SIM), wherein the first information comprises a first service request signaling containing a paging rejection indication, and the paging rejection indication is configured to indicate that the first SIM rejects paging;

determining time for re-paging the first SIM in response to the first information indicating that the first SIM rejects paging, and receiving a second service request signaling not containing the paging rejection indication, wherein determining the time for re-paging the first SIM in response to the first information indicating that the first SIM rejects paging comprises:

determining a paging occasion closest to when receiving the second service request signaling as the time for re-paging the first SIM based on the first service request signaling.

2. The method according to claim 1, wherein, the first service request signaling further comprises auxiliary information, and determining the time for re-paging the first SIM in response to the first information indicating that the first SIM rejects paging comprises:

determining the time for re-paging the first SIM based on the auxiliary information in response to the paging rejection indication.

3. The method according to claim 2, wherein the auxiliary information comprises at least one of the following:

time information for indicating an interval duration for re-paging the first SIM; or service information for indicating a service of a second SIM that causes the first SIM to reject paging.

4. The method according to claim 1, wherein the network device comprises a core network device, and determining the time for re-paging the first SIM in response to the first information indicating that the first SIM rejects paging comprises:

determining the time for re-paging the first SIM based on the first information.

5. The method according to claim 4, wherein receiving the first information for the first subscriber identity module SIM comprises:

receiving the first information for the first SIM sent by a UE; or receiving the first information for the first SIM sent by a base station.

6. The method according to claim 4, further comprising:

sending the time for re-paging the first SIM to a base station.

7. The method according to claim 1, wherein the network device comprises a base station, and determining the time for re-paging the first SIM in response to the first information indicating that the first SIM rejects paging comprises:

receiving the time for re-paging the first SIM sent by a core network.

8. The method according to claim 7, further comprising:

sending the time for re-paging the first SIM to the first SIM through a RRC signaling.

9. The method according to claim 7, wherein receiving the first information for the first subscriber identity module SIM comprises:

receiving the first information for the first SIM sent by a UE.

10. The method according to claim 1, further comprising:

stopping paging the first SIM at any time after receiving the first information and before the time for re-paging the first SIM.

11. A processing method for restoring paging, performed by user equipment UE with multiple subscriber identity modules (SIMs), comprising:

sending, in response to determining to reject to respond to a paging message for a first SIM in an idle state among the multiple SIMs, first information to a first network that sends the paging message, wherein the first information indicates that the first SIM rejects paging, and the first information is at least used for the first network to determine time for re-paging the first SIM, the first information comprises a first service request signaling containing a paging rejection indication, and the paging rejection indication is configured to indicate that the first SIM rejects paging; and sending a second service request signaling not containing the paging rejection indication; wherein the second service request signaling is used to determine the time for re-paging the first SIM.

12. The method according to claim 11, wherein the first service request signaling further comprises auxiliary information; and the auxiliary information is used for the first network to determine the time for re-paging the first SIM.

13. The method according to claim 12, wherein the auxiliary information comprises at least one of the following:

time information for indicating an interval duration for re-paging the first SIM;

service information for indicating a service of a second SIM that causes the first SIM to reject paging.

14. The method according to claim 11, further comprising:

receiving the time for re-paging the first SIM sent by a base station through a radio resource control RRC signaling.

15. The method according to claim 11, wherein sending the first information to the first network that sends the paging message comprises:

sending the first information to a core network device or a base station of the first network that sends the paging message, wherein the first information indicating that the first SIM rejects paging.

16. A communication device, comprising:

a processor, a memory for storing processor executable instructions;

wherein, when running the executable instructions, the processor is configured to implement the processing method for restoring paging according to claim 11.

17. A communication device, wherein the communication device comprises:

a processor;

a memory for storing processor executable instructions;

wherein, when running the executable instructions, the processor is configured to execute following steps:

receiving first information for a first subscriber identity module (SIM), wherein the first information comprises a first service request signaling containing a paging rejection indication, and the paging rejection indication is configured to indicate that the first SIM rejects paging;

determining time for re-paging the first SIM in response to the first information indicating that the first SIM rejects paging; and receiving a second service request signaling not containing the paging rejection indication, wherein determining the time for re-paging the first SIM in response to the first information indicating that the first SIM rejects paging comprises:

determining a paging occasion closest to when receiving the second service request signaling as the time for re-paging the first SIM based on the first service request signaling.

* * * * *